US007003160B2

(12) United States Patent
Horie

(10) Patent No.: US 7,003,160 B2
(45) Date of Patent: Feb. 21, 2006

(54) IMAGE PROCESSING APPARATUS, IMAGE PROCESSING METHOD, AND COMPUTER READABLE RECORDING MEDIUM RECORDING IMAGE PROCESSING PROGRAM FOR PROCESSING IMAGE OBTAINED BY PICKING UP OR READING ORIGINAL

(75) Inventor: Daisaku Horie, Uji (JP)

(73) Assignee: Minolta Co., Ltd., Osaka (JP)

( * ) Notice: Subject to any disclaimer, the term of this patent is extended or adjusted under 35 U.S.C. 154(b) by 555 days.

(21) Appl. No.: 09/940,623

(22) Filed: Aug. 29, 2001

(65) Prior Publication Data

US 2002/0025080 A1 Feb. 28, 2002

(30) Foreign Application Priority Data

Aug. 30, 2000 (JP) ............................ 2000-260961

(51) Int. Cl.
*G06K 9/48* (2006.01)

(52) U.S. Cl. ...................................... 382/199; 382/266

(58) Field of Classification Search ................ 382/199, 382/274, 275, 162, 167, 202, 266; 358/516, 358/520
See application file for complete search history.

(56) References Cited

U.S. PATENT DOCUMENTS 6,141,433 A * 10/2000 Moed et al. ................ 382/103
6,167,167 A * 12/2000 Matsugu et al. ............ 382/283
6,266,054 B1 * 7/2001 Lawton et al. .............. 345/581
6,317,223 B1 * 11/2001 Rudak et al. ............... 382/275
6,731,795 B1 * 5/2004 Ricard ........................ 382/167

FOREIGN PATENT DOCUMENTS

JP 01-165264 6/1989
JP 02-230870 9/1990
JP 2000-182052 6/2000

* cited by examiner

*Primary Examiner*—Joseph Mancuso
*Assistant Examiner*—Dennis Rosario
(74) *Attorney, Agent, or Firm*—McDermott Will & Emery LLP

(57) ABSTRACT

The image processing apparatus includes a CCD that receives an image, a fold detecting unit that detects edges using a lightness component of the received image and selects a specific one of the detected edges, and a fold erasing unit that corrects the lightness component of the selected specific edge. Thus, an image processing apparatus allowing removal of a noise appearing on the lightness component is provided.

12 Claims, 10 Drawing Sheets

F I G. 1
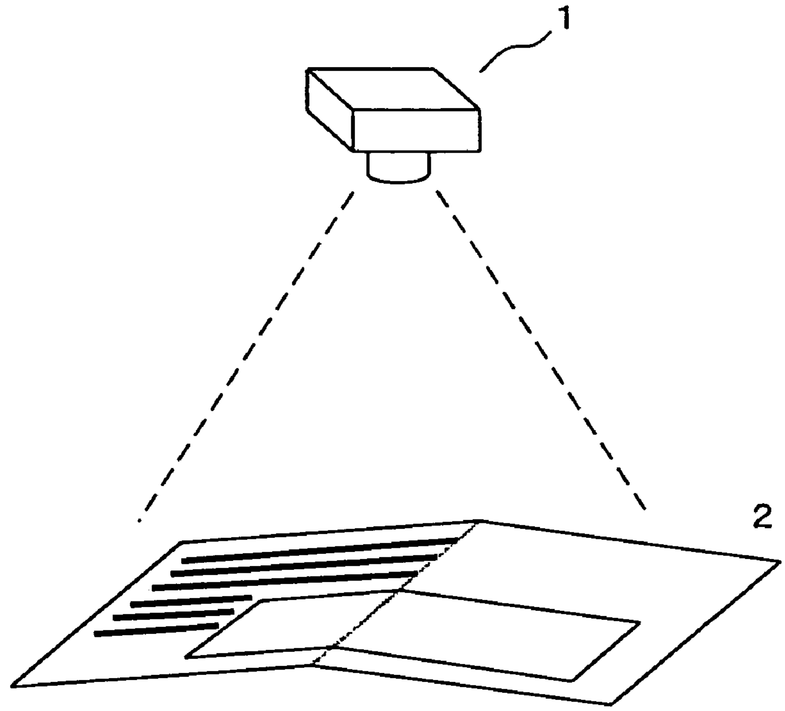
F I G. 2
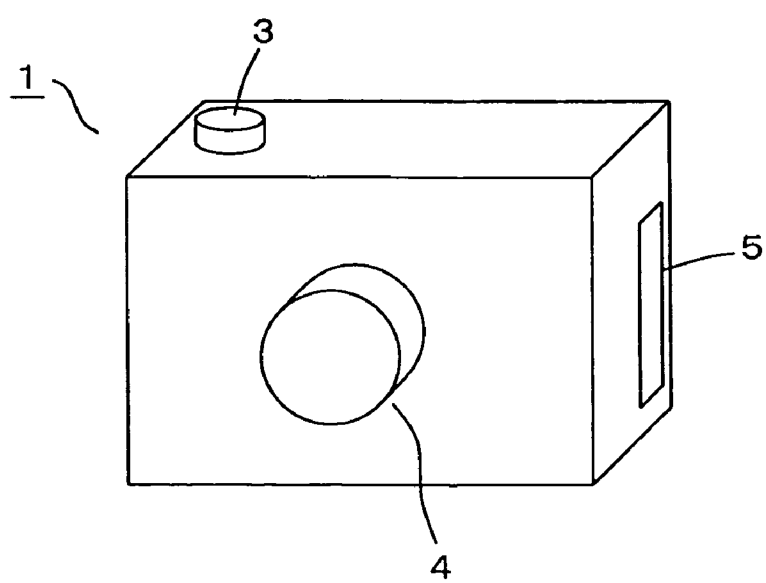

F I G. 4
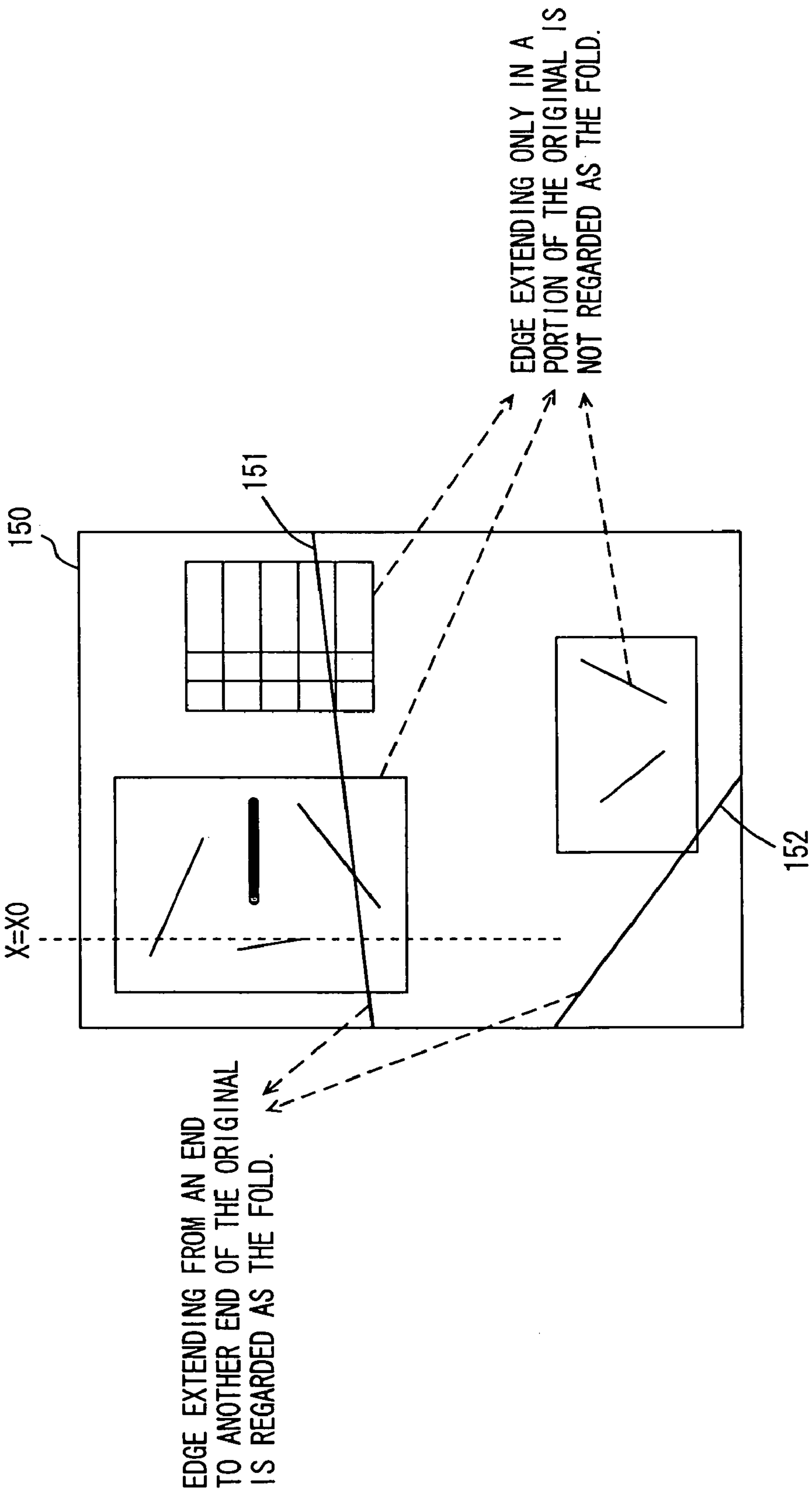

F I G. 8
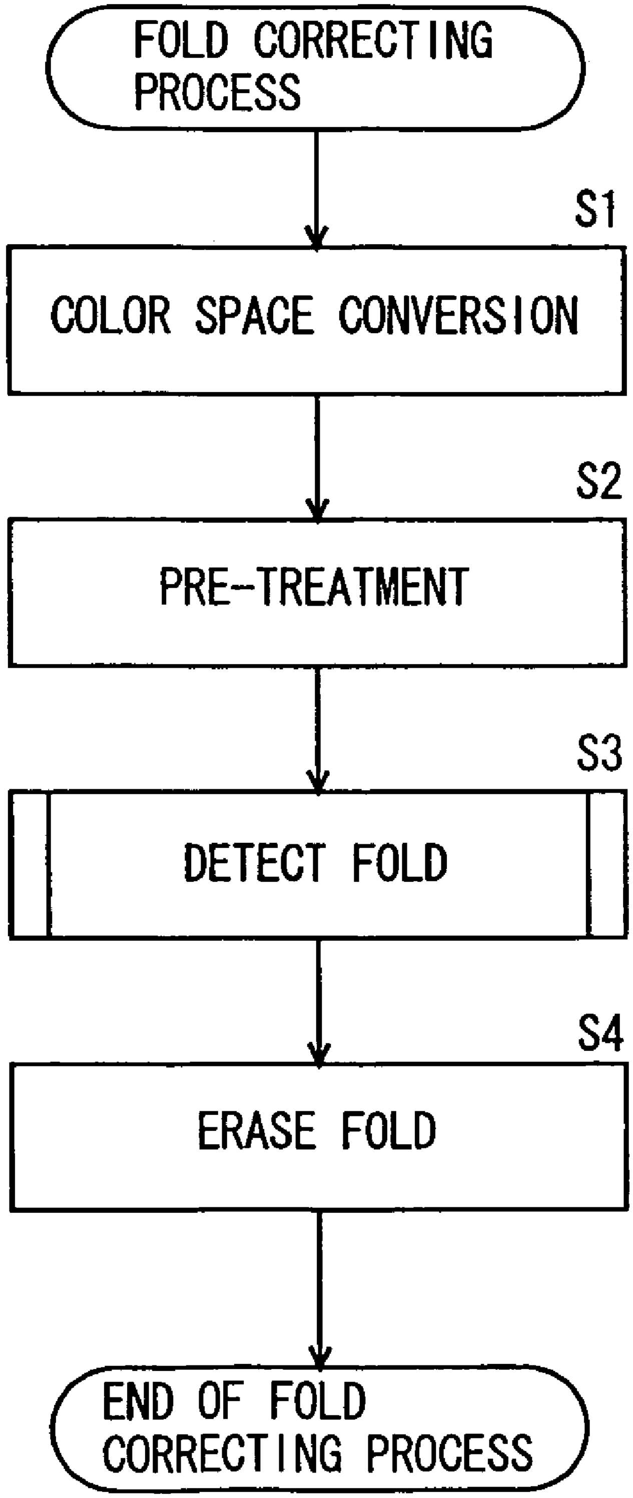

F I G. 1 2
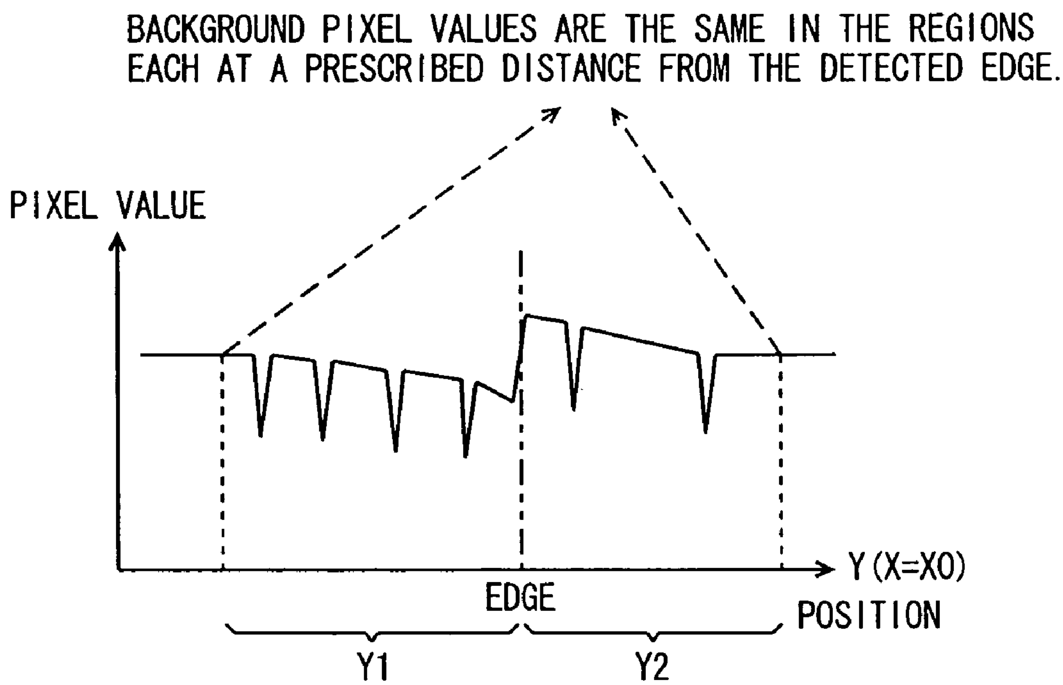
F I G. 1 3
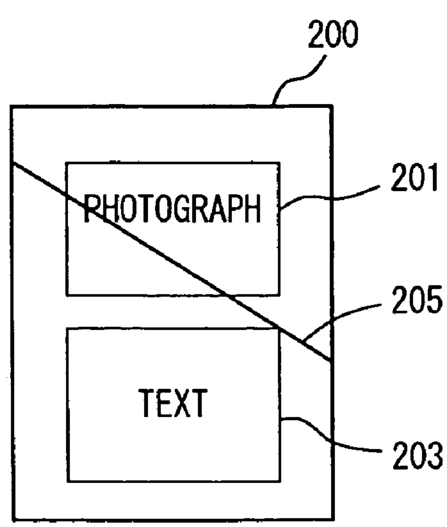

F I G. 1 4
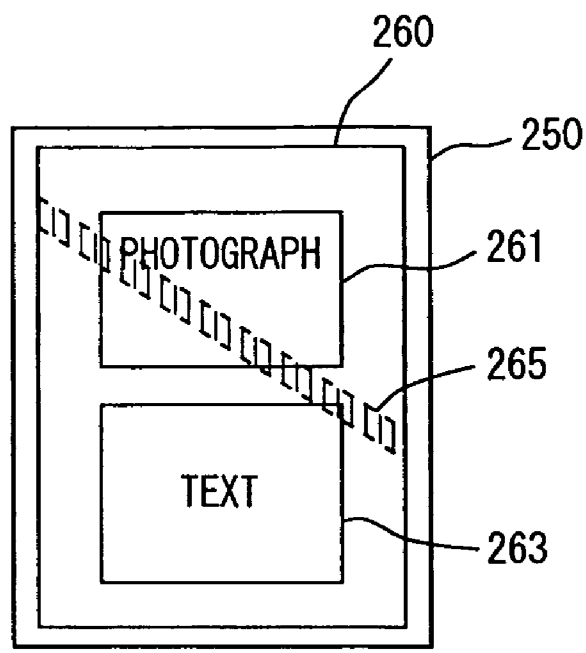
F I G. 1 5
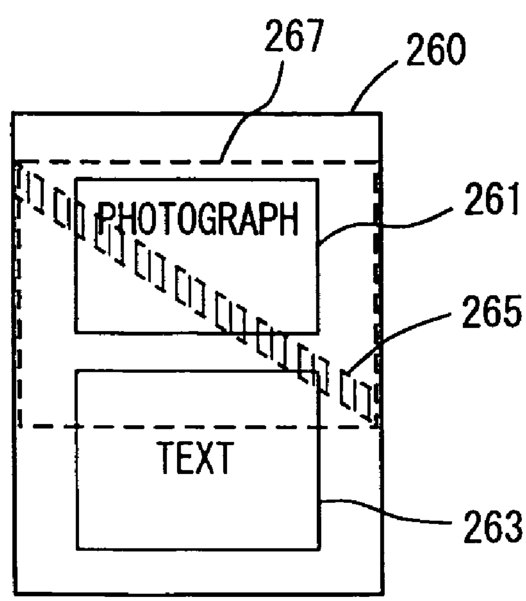

IMAGE PROCESSING APPARATUS, IMAGE PROCESSING METHOD, AND COMPUTER READABLE RECORDING MEDIUM RECORDING IMAGE PROCESSING PROGRAM FOR PROCESSING IMAGE OBTAINED BY PICKING UP OR READING ORIGINAL

This application is based on application No. 2000-260961 filed in Japan, the content of which is hereby incorporated by reference.

BACKGROUND OF THE INVENTION

1. Field of the Invention

The present invention relates to apparatus and method for image processing, and a computer readable recording medium in which an image processing program is recorded. More particularly, the present invention relates to an image processing apparatus, an image processing method, and a computer readable recording medium recording an image processing program for processing an image obtained by picking up or reading an original.

2. Description of the Related Art

Conventionally, a non-contact type image pickup device like a digital camera and a contact type input device like an image scanner have been used to convert an original having an image formed on a paper or the like to digital data. Once an original paper is folded, a fold line or a fold may remain thereon. When shooting such an original including the fold with a digital camera or reading it with an image scanner, the amount of reflected light would differ in the folded portion from the remaining portion due to surface irregularity at the folded portion. As a result, the image obtained by shooting would include noise at the folded portion, with its luminance value varied from that of the remaining portion. Similarly, the image read by the image scanner would include noise at the folded portion.

FIG. 13 shows an original to be shot by a digital camera. The original 200 includes a region 201 having a photograph therein and a region 203 having text therein. Original 200 has been folded and has a fold line 205 remained thereon.

FIG. 14 schematically shows an image obtained by shooting the original shown in FIG. 13 by a digital camera. Referring to FIG. 14, the picked up image 250 includes a region 260 having original 200 expressed therein. Region 260 in turn includes a region 261 corresponding to photo region 201 of original 200, a region 263 corresponding to text region 203, and shade 265 corresponding to a portion around fold line 205 of original 200. Shade 265 appears because of the difference in the amount of reflected light in the folded portion from the remaining portion of original 200 due to the surface irregularity at fold line 205.

When binarizing picked up image 205, an edge originally not existent on original 200 comes to appear, since the lightness is lower in shade 265 than in the remaining portion. This degrades accuracy in a character recognition process or the like following the binarizing process. In the case where image 250 is subjected to a process for extracting a rectangular region enclosing a photograph or the like therein, the accuracy of extraction would also be degraded. FIG. 15 shows a photo region that would be extracted when the photo region extracting process is conducted for the image shown in FIG. 14. Referring to FIG. 15, the portion of shade 265 is misjudged to have an attribute as a picture, so that the rectangular region 267 has been extracted wrongly as the photo region.

Besides the binarizing process, in a process of compressing an image picked up from an original graphic printed with a limited number of colors by indexing the colors, the rate of compression would be degraded due to a considerable increase in the number of colors at a portion within the image corresponding to the fold of the original.

As a technique for correcting the shade appearing on an image obtained from pickup of an original due to a fold on the original, an image reader performing shading correction has been disclosed in Japanese Patent Laying-Open No. 1-165264. This image reader corrects a pixel value based on shading information obtained in advance from pickup of a white plate.

Further, Japanese Patent Laying-Open No. 2-230870 discloses an image reader which detects a background luminance value of an original from an image obtained from pickup thereof, and eliminates the background based on the detected background luminance value.

There is another method for correcting shading by additionally providing a sensor to detect height information of an original and estimating unevenness in illuminance from the detected height of the original. A sensor may be of the type that obtains the height information from a radiated result of spot light or slit light.

These conventional techniques however exhibit various problems. In the image reader disclosed in Japanese Patent Laying-Open No. 1-165264, the white plate is used. Since the white plate does not include a fold at a position corresponding to that of the fold on the original, correction of such a fold cannot be made only with the shading information obtained from the white plate.

With the image reader disclosed in Japanese Patent Laying-Open No. 2-230870, correction cannot be made for an image having almost no background region.

Further, in order to detect a local change in height of the original due to a fold or the like with the method utilizing the height information obtained from a separate sensor, it is necessary to obtain the height information from a large number of positions. This increases the number of pieces of the height information, thereby decreasing the processing speed. In addition, to detect a minute change in height, an expensive sensor will be required or the device size will be increased. There also arises a need for detailed information about lighting conditions including position, direction and intensity of indoor or solar light.

SUMMARY OF THE INVENTION

The present invention is made to solve the above-described problems. An object of the present invention is to provide an apparatus and a method for image processing allowing removal of a noise appearing on a lightness component within an image.

Another object of the present invention is to provide an apparatus and a method for image processing allowing removal of a noise due to a fold on an original from an image.

A further object of the present invention is to provide a computer readable recording medium recording an image processing program to cause a computer to perform image processing allowing removal of a noise appearing on a lightness component within an image.

Yet another object of the present invention is to provide a computer readable recording medium recording an image processing program to cause a computer to perform image processing allowing removal of a noise due to a fold on an original from an image.

To achieve the above-described objects, the image processing apparatus according to an aspect of the present invention includes a receiving unit to receive an image, an edge detecting unit to detect an edge using a lightness component of the received image, a selecting unit to select a specific one of the detected edges, and a correcting unit to correct the lightness component of the selected specific edge.

According to the present invention, it is possible to provide an image processing apparatus allowing removal of a noise appearing on the lightness component.

Preferably, the image processing apparatus further includes a unit to extract an original included in the image, and the selecting unit selects an edge continuously extending from a first end to a second end of the extracted original.

According to the present invention, the edge uninterrupted from the first end to the second end of the extracted original is selected. If the original includes a fold, the fold will appear on a picked up image as a noise of shade. It is often the case that such a fold of the original extends from an end to another end thereof. Thus, by selecting the edge continuously extending from the first end to the second end of the original included in the image, the noise resulting from the fold of the original can be selected from the image. As a result, it is possible to provide an image processing apparatus allowing removal of a noise due to a fold of the original from the image.

According to another aspect of the present invention, the computer readable recording medium recording an image processing program records the image processing program to cause a computer to perform the step of receiving an image picked up from an original, the step of detecting an edge using a lightness component of the received image, the step of selecting a specific one of the detected edges, and the step of correcting the lightness component of the selected specific edge.

According to the present invention, it is possible to provide a computer readable recording medium recording an image processing program to cause a computer to perform image processing that enables removal of a noise appearing on the lightness component.

Preferably, the selecting step of the image processing program includes the step of selecting an edge continuously extending from a first end to a second end of the original included in the image.

According to the present invention, it is possible to provide a computer readable recording medium recording an image processing program to cause a computer to perform image processing that enables removal of a noise due to a fold of the original from the image.

According to another aspect of the present invention, the image processing method includes the step of receiving an image picked up from an original, the step of detecting an edge using a lightness component of the received image, the step of selecting a specific one of the detected edges, and the step of correcting the lightness component of the selected specific edge.

According to the present invention, it is possible to provide an image processing method that enables removal of a noise appearing on the lightness component.

Preferably, the selecting step of the image processing method includes the step of selecting an edge continuously extending from a first end to a second end of the original included in the image.

According to the present invention, it is possible to provide an image processing method that enables removal of a noise resulting from a fold on the original from the image.

According to yet another aspect of the present invention, the image processing apparatus includes an acquiring unit to acquire an image signal indicating an original image, an edge detecting unit to detect an edge in a lightness image primarily representing lightness of the original image as a lightness edge, a fold edge selecting unit to select any of the detected lightness edges that connects an edge corresponding to an end of an original to another edge corresponding to another end of the original as a fold edge attributable to a fold of the original, and a processing unit to process the image signal in the portion corresponding to the fold edge to eliminate an effect of the fold of the original on the original image.

According to the present invention, it is possible to provide an image processing apparatus allowing removal of a noise resulting from a fold of the original from the image.

According to a further aspect of the present invention, the image processing apparatus includes an acquiring unit to acquire an image signal representing a color original image with three components, a color space converting unit to perform coordinate transformation of the image signal such that the color original image is represented by a lightness component primarily representing lightness and another component, and a correcting unit to correct the lightness component in a portion of the color original image that is detected as an edge portion in a lightness image including the lightness component and is undetected as an edge portion in a color difference image including the another component, so that the relevant portion is undetected as the edge portion in the lightness image.

According to the present invention, the edge appearing only on the lightness component is selected as the noise. Thus, it is possible to provide an image processing apparatus allowing accurate removal of a noise of the lightness component from the image.

According to a still further aspect of the present invention, the image processing apparatus includes an acquiring unit to acquire an image signal representing an original image, an edge detecting unit to detect an edge in a lightness image primarily representing lightness of the original image as a lightness edge, and a correcting unit to correct a lightness component in a portion of the original image detected as the lightness edge when a difference in lightness between portions of the original image each at a prescribed distance from the relevant lightness edge on its respective sides is smaller than a prescribed threshold value, so that the relevant portion is undetected as the edge in the lightness image.

According to the present invention, a boundary of two regions whose difference in lightness is at least a threshold value is prevented from being wrongly selected as the noise. Thus, it is possible to provide an image processing apparatus allowing accurate removal of a noise in the lightness component from the image.

According to yet another aspect of the present invention, the image processing apparatus includes an acquiring unit to acquire an image signal indicating an original image, an edge detecting unit to detect an edge in a lightness image primarily representing lightness of the original image as a lightness edge, and a correcting unit to correct a lightness component in a portion of the original image detected as the lightness edge when portions of the original image each at a prescribed distance from the relevant lightness edge on its respective sides have the same attribute of image, so that the relevant portion is undetected as the edge in the lightness image.

According to the present invention, a boundary of two regions having different attributes is prevented from being wrongly selected as the noise. Thus, it is possible to provide an image processing apparatus allowing accurate removal of a noise of the lightness component from the image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a digital camera in accordance with an embodiment of the present invention, which is picking up an image from an original.

FIG. 2 is a perspective view of the digital camera in accordance with the embodiment seen from its front.

FIG. 4 illustrates how a portion of an image corresponding to a fold of an original is detected.

FIG. 8 is a flow chart illustrating a fold correcting process conducted by the digital camera in accordance with the embodiment.

FIG. 12 shows pixel values on a line intersecting the detected edge at right angles.

FIG. 13 schematically shows an original to be shot by a digital camera.

FIG. 14 schematically shows an image picked up by a digital camera from the original shown in FIG. 13.

FIG. 15 shows a photo region extracted from the image shown in FIG. 14 as a result of a photo region extracting process.

DESCRIPTION OF THE PREFERRED EMBODIMENTS

Figure 3:
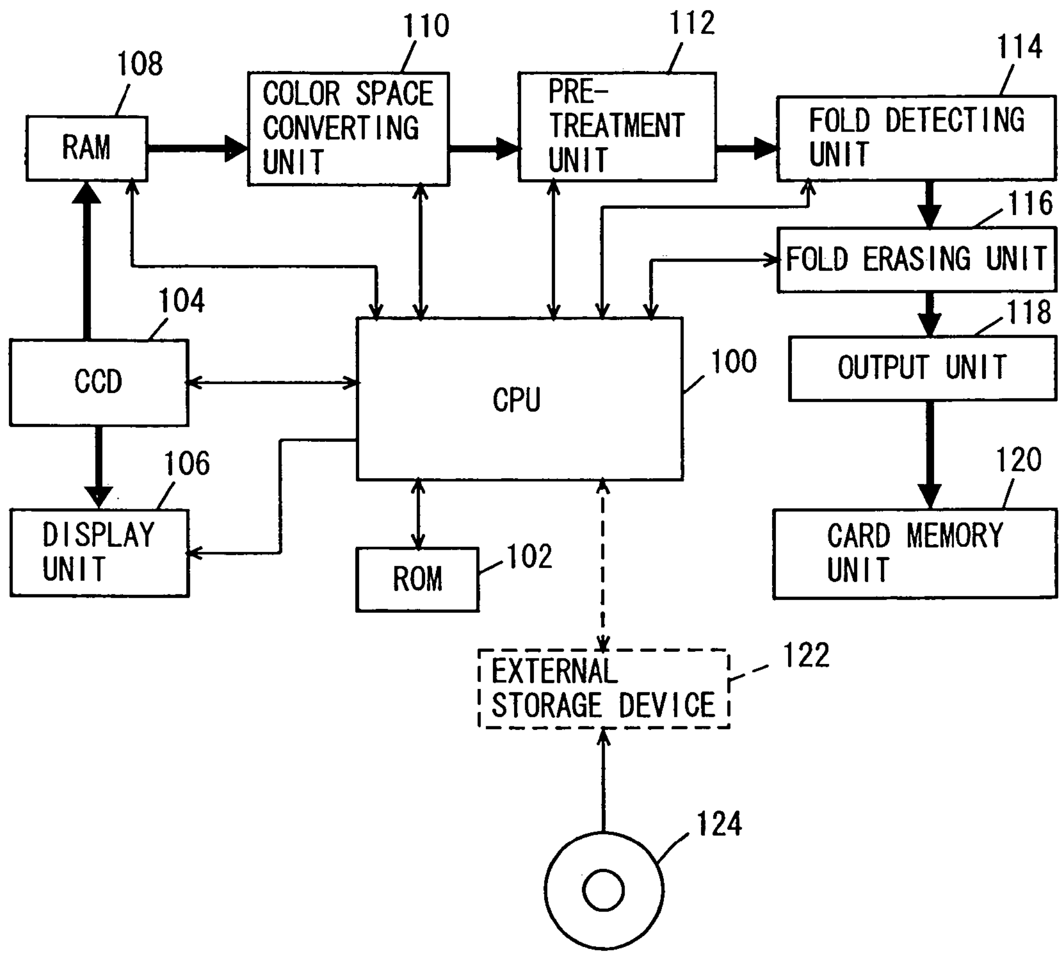
FIG. 3 is a block diagram showing a circuit configuration of the digital camera in accordance with the embodiment.

Hereinafter, an image processing apparatus in accordance with an embodiment of the present invention will be described, taking a digital camera as an example. In the drawings, the same reference character denotes the same or corresponding portion, and description thereof will not be repeated where appropriate.

Referring to FIGS. 1 and 2, digital camera 1 includes a shooting button 3, a pickup lens unit 4 and a card slot 5.

The image shot by digital camera 1 is stored as electronic data on a hard disc card (not shown) placed within digital camera 1. Here, the hard disc card is a recording medium of image data, for which the one in conformity with PCMCIA (Personal Computer Memory Card International Association) may be used, or a memory card or the like may be used. Alternatively, a mini disc (MD) or a digital video disc (DVD) may be employed as the recording medium. Further, it is also possible to output the image data directly to a printer or the like via a SCSI (small computer system interface) cable, for example, instead of recording it on the recording medium.

Digital camera 1 of the present embodiment can improve image quality when an original in the paper form, such as handout at a conference, catalog, magazine or research report, is recorded or output as electronic data.

FIG. 3 is a block diagram showing a circuit configuration of digital camera 1 of the present embodiment. Referring to FIG. 3, digital camera 1 includes a central processing unit (hereinafter, "CPU") 100 performing an overall control of digital camera 1, a charge coupled device (hereinafter, "CCD") 104 performing an image pickup, a display unit 106 displaying an picked up image, a random access memory (hereinafter, "RAM") 108 temporarily storing the image from CCD 104, a color space converting unit 110 converting the picked up image to a prescribed color space, a pre-treatment unit 112 performing a prescribed pre-treatment on the converted image, a fold detecting unit 114 detecting a portion corresponding to a fold in the original from the image having undergone the pre-treatment at pre-treatment unit 112, a fold erasing unit 116 removing the detected fold, an output unit 118 outputting the image having the fold removed therefrom, a card memory unit 120 storing the image, and a read only memory hereinafter, "ROM") 102 storing a program to be executed by CPU 100.

Here, a reading device 122 may be connected to digital camera 1 such that a program for the control of digital camera 1 can be read from CD-ROM 124, magneto-optical disc, digital video disc, flexible disk or the like. In this case, a program for causing CPU 100 to execute a fold correcting process, which will be described later, is recorded on a recording medium like CD-ROM 124 and is read by reading device 122, so that the fold correcting process is carried out.

This fold correcting process may be carried out inside digital camera 1, or alternatively, it may be performed at another terminal such as a personal computer or another camera connected to digital camera 1 by transferring the image data thereto.

An actual shooting process will now be described with reference to the block diagram shown in FIG. 3. In FIG. 3, thick arrows represent the flow of the image, and thin arrows represent the flow of the control data. When a user turns on the camera, a scene being taken by pickup lens unit 4 is displayed on display unit 106 via CCD 104.

Upon detection of pressing of shooting button 3, CPU 100 designates integration to CCD 104. When the integration is completed, it dumps the CCD data to RAM 108, and causes display unit 106 to display the image in freeze-frame.

The image from CCD 104 is stored in RAM 108. Here, the image stored in RAM 108 is a full-color image consisting of multi-valued pixels of R (red), G (green) and B (blue) with 8 bits each. Once the image from CCD 104 is stored in RAM 108, it is subjected to respective processes in color space converting unit 110, pre-treatment unit 112, fold detecting unit 114 and fold erasing unit 116. The image having thus undergone the fold correcting process is output from output unit 118 to card memory unit 120.

This card memory unit 120 may be a hard disc, or may be an external storage device or terminal.

Color space converting unit 110 converts the image stored in RAM 108 into color space having a lightness component. As the color space, YUV, L*a*b*, HSL or other color systems may be employed. In an environment for shooting an original, if the light radiated from a light source has a frequency component deflected to yellow or blue, for example, a new color system wherein a pixel value obtained by receiving the light radiated from the light source and reflected on a white plate is used as the lightness component without alteration may be established.

Generally, a fluorescent light is used as the light source in the environment for shooting an original including text or the like. When the light source is the fluorescent light, it is considered that the component representing intensity of the light radiated from the fluorescent light is approximately equal to the Y component of the YUV color system. Thus, in the present embodiment, color space converting unit 110 performs conversion to the color space of the YUV color system.

Of the images converted by color space converting unit 110 into those expressed with lightness and other components, the one expressed only with the lightness component is called a lightness image, and the one expressed with the other components is called a color difference image.

Pre-treatment unit 112 performs pre-treatment for edge detection on the lightness image generated by color space converting unit 110. As the pre-treatment, sharpening process, contrast emphasizing process, minimum value filtering process, maximum value filtering process, smoothing process for noise removal, and image downsizing process are conducted in this order. The sharpening process is performed to emphasize the edge of the image. The minimum value filtering process is performed to convert a pixel value within a prescribed block to a minimum value for the purpose of connecting the edge. The maximum value filtering process is conducted to replace a pixel value in a prescribed block with a maximum value so as to thin an edge that has become too thick or to remove a noise. The image downsizing process is conducted to reduce the amount of data used for noise removal and edge detection.

It is preferred to change the order of these processes, the kinds or degrees of the processes as necessary, according to the entire configuration of the digital camera, lighting conditions at the time of shooting, kinds of subjects or the like, to increase the accuracy of the edge extraction.

Pre-treatment unit 112 may conduct the pre-treatment for the image before being converted by color space converting unit 110.

Fold detecting unit 114 detects a portion of the image having undergone the pre-treatment corresponding to the fold of the original. To this end, an absolute value of quadratic differential is first calculated for the image having undergone the pre-treatment to generate an edge image. The edge image thus represents the degrees of changes of pixel values. Accordingly, an edge in an image corresponds to a portion within the image where the pixel values show sudden changes. The edges corresponding to ends of the original are then detected from the generated edge image. When the image includes the original therein, the edges corresponding to the ends of the original will be detected as an approximately rectangular shape. An edge connecting two points on these edges corresponding to the ends of the original is then detected as the edge corresponding to the fold of the original. This edge detecting process will be described later in detail.

The edge detection may be conducted using any conventional techniques including those based on Hough transformation or edge tracing.

To extract a region corresponding to the original, a method of detecting background luminance values from the image and using the detected results for the extraction, or a method utilizing edges may be employed.

Fold erasing unit 116 conducts correction of the image stored in RAM 108 in its portion corresponding to the fold detected by fold detecting unit 114. This correction is performed only for the lightness image. In this correction, a pixel value of the lightness image is corrected according to its distance from a point on the portion corresponding to the detected fold.

FIG. 4 illustrates how a portion of the lightness image corresponding to the fold of the original is extracted. The portion of the lightness image corresponding to the original 150 includes a plurality of edges. Among them, the one extending from an end to another end of original 150 is most likely to correspond to the fold of the original. In the example shown in FIG. 4, edges 151 and 152 are detected, since they are considered to correspond to the folds. Other edges are not detected as those corresponding to the folds, since they are considered as edges included in pictures or letters within the original.

Figure 5:
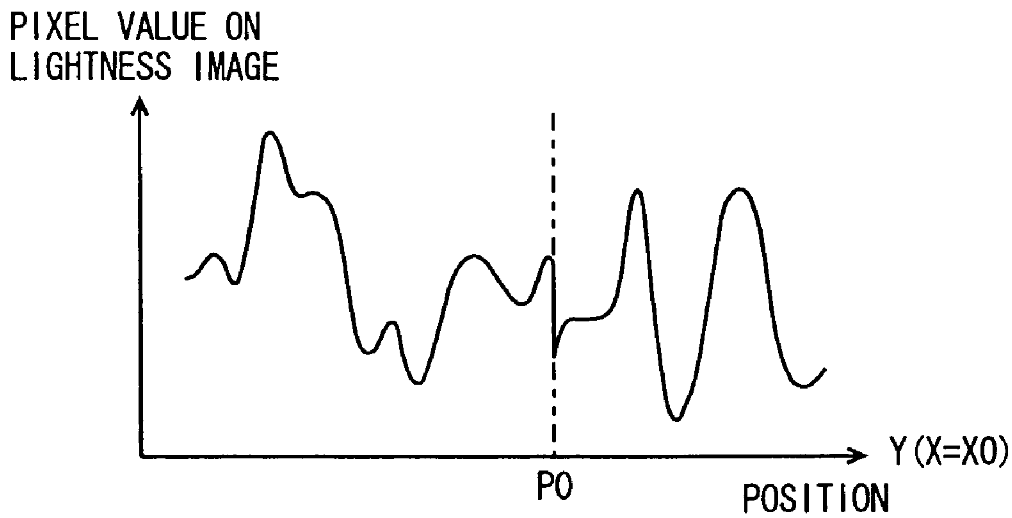
FIG. 5 shows pixel values on a line (X=X0) in a lightness image.

FIG. 5 shows pixel values on a line X=X0 in the lightness image shown in FIG. 4. Referring to FIG. 5, there is a sudden change of the pixel values at a position P0. Thus, the position P0 is detected as an edge.

Figure 6:
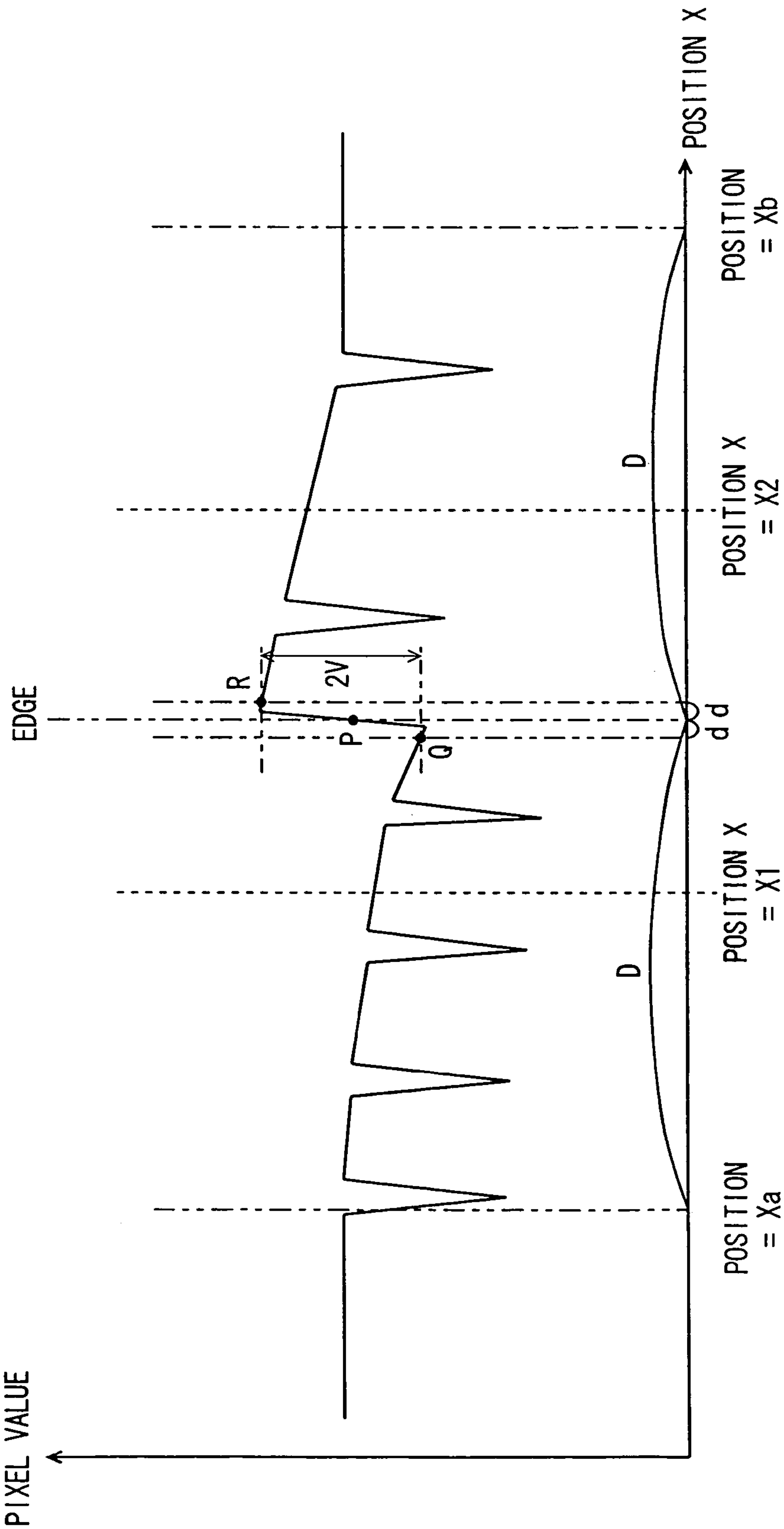
FIG. 6 illustrates correction carried out by a fold erasing unit of the digital camera in accordance with the embodiment.

FIG. 6 illustrates a correcting method employed at the fold erasing unit of the digital camera of the present embodiment. In FIG. 6, the horizontal axis represents the position X of a pixel, and the vertical axis represents the pixel value in the lightness image. Referring to FIG. 6, a maximum correction amount V is determined as half the amount of change in pixel value between positions Q and R that are each at a minute distance d from the position P of the detected edge. The correction of the lightness image is performed for a region from a position Xb to a position Xa, where position Xb is a distance D apart from edge position P in the positive direction, and position Xa is distance D apart from edge position P in the negative direction. A pixel value Y1 at a position X1 in the negative direction from edge position P is set to Y1+V×(X1−Xa)/D. A pixel value Y2 at a position X2 in the positive direction from edge position P is set to Y2 −V×(Xb−X2)/D. Thus, the pixel values around edge position P in the lightness image are corrected and the change at position P is smoothed.

Besides this correcting method, any other method may be employed which can smooth out the changes of the pixel values in the lightness image around edge position P.

Figure 7:
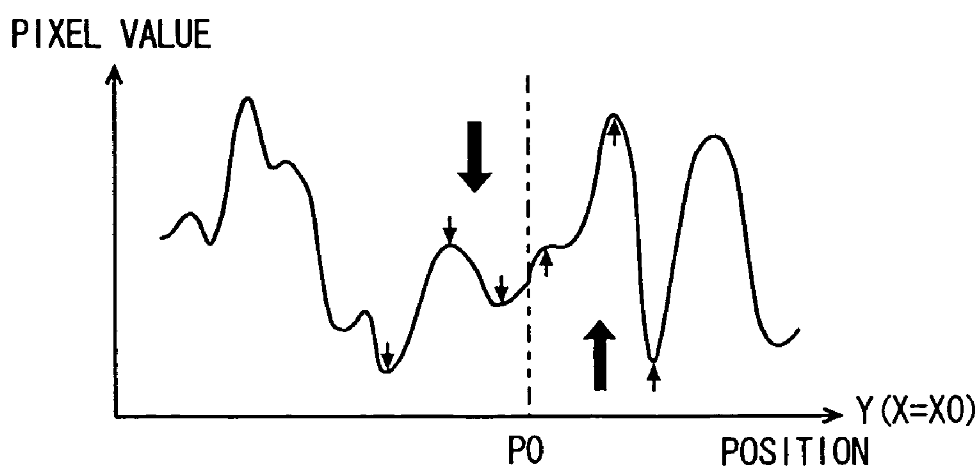
FIG. 7 shows pixel values on the line (X=X0) in the lightness image after the correction.

FIG. 7 shows pixel values on the line X=X0 in the lightness image after correction. Referring to FIG. 7, the pixel values around edge position P0 have been corrected to smooth out the change at the position P0.

The fold correcting process being conducted by the digital camera of the present embodiment will now be described. FIG. 8 is a flow chart showing the flow of the fold correcting process conducted by digital camera 1. Referring to FIG. 8, in the fold correcting process, color space converting unit 110 first converts the image stored in RAM 108 into a lightness image and a color difference image in the color space of YUV color system (step S1). Thus, the lightness image composed only of the lightness component can be obtained from the full-color image shot by the camera. The following processes are conducted for the color space of the YUV color system.

Pre-treatment unit 112 conducts prescribed pre-treatment on the lightness image. As the pre-treatment, sharpening process, contrast emphasizing process, maximum value filtering process, minimum value filtering process, downsizing process and smoothing process are conducted in this order (step S2).

Fold detecting unit 114 detects a portion of the lightness image corresponding to the fold of the original (step S3). A correction of the lightness image is then made for the detected portion corresponding to the fold (step S4), and the process is terminated.

Figure 9:
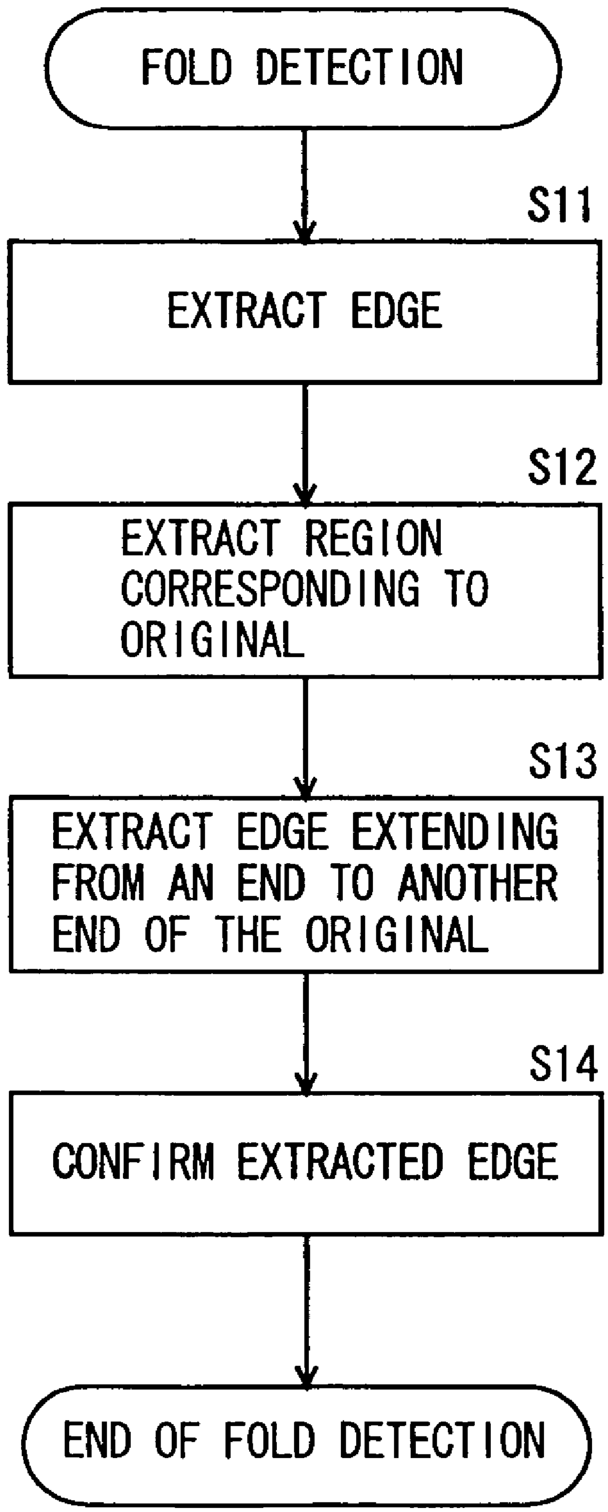
FIG. 9 is a flow chart illustrating a fold detecting process conducted by the digital camera in accordance with the embodiment.

FIG. 9 is a flow chart showing the flow of the fold detecting process conducted by digital camera 1 of the present embodiment. The fold detecting process corresponds to step S3 of FIG. 8. Referring to FIG. 9, in the fold detecting process, an edge image is first generated by calculating an absolute value of quadratic differential for each pixel of the lightness image having undergone the pre-treatment (step S11). In the edge image, portions where the pixel values of the lightness image exhibit sudden changes are extracted as edges, which are differentiated from portions where the pixel values of the lightness image do not make sudden changes.

Using the extracted edges, a region corresponding to the original included within the image, or the original region, is extracted (step S12). The extraction of this original region is performed by extracting edges forming a rectangle. Alternatively, the original region may be extracted by utilizing detected results of background luminance values.

After the extraction of the original region, the edges included therein are examined, and any one continuously extending from an end to another end of the original is extracted therefrom (step S13). Specifically, the edges located in the vicinity of the ends of the original are first detected. It is then determined, for each pair of any two of the detected edges, whether there is an edge extending in the same direction and connecting the relevant pair of edges. In other words, it is determined whether there is an edge on a line connecting the arbitrary two edges. If so, the relevant edge is extracted as the edge extending continuously from an end to another end of the original.

If there is no edge connecting the arbitrary two edges, it is determined that the relevant pair of edges does not satisfy the requirement. Repeating this examination for every pair of edges located in the vicinity of the ends of the original, all the edges extending continuously from an end to another end of the original are detected.

As the edge detecting method, the conventional methods based on the Hough transformation or edge tracing may be employed.

In the next step S14, it is determined whether each detected edge continuously extending from an end to another end of the original truly corresponds to the fold of the original. For this confirmation, a method employing a color difference image, a method utilizing a background region of the image, and a method utilizing an attribute of the image may be employed by selectively using one of them or by combining two of them.

Method Employing Color Difference Image

In this method, it is examined whether the edge continuously extending from an end to another end of the original extracted from the lightness image is also detected from the color difference image. If not, it is determined that the relevant edge corresponds to the fold of the original. This is because the noise due to the fold of the original would not change the color on the original, so that it should appear only on the lightness image.

Method Utilizing Lightness of Background Region

Figure 10:
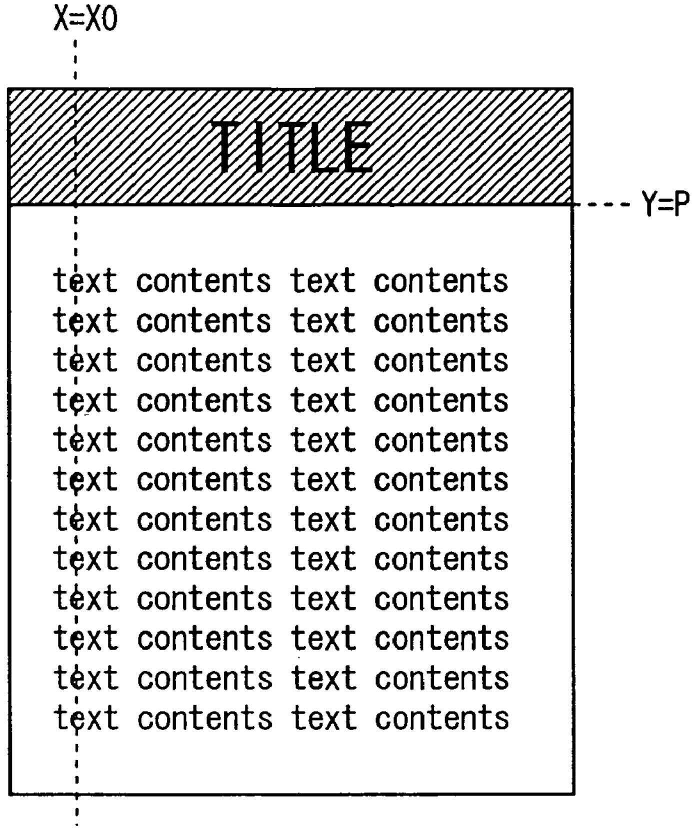
FIG. 10 shows an example of the image picked up by the digital camera in accordance with the embodiment.

This method is advantageous for an original in which background regions different in lightness are located adjacent to each other. FIG. 10 shows an example of the image shot by digital camera 1 of the present embodiment. Referring to FIG. 10, the original included in the image has a title region and another region that are different in background color from each other.

With this kind of original, a boundary between the title region and the other region will be extracted as the edge continuously extending from an end to another end of the original. However, if the correction as above is made for this edge, such an unnecessary correction will deteriorate the image quality. Thus, according to the present invention, background pixel values on opposite sides of the edge connecting an end to another end of the original are taken into consideration. In this example, they correspond to the background pixel values in the title region and in the other region each at a prescribed distance from the boundary.

Figure 11:
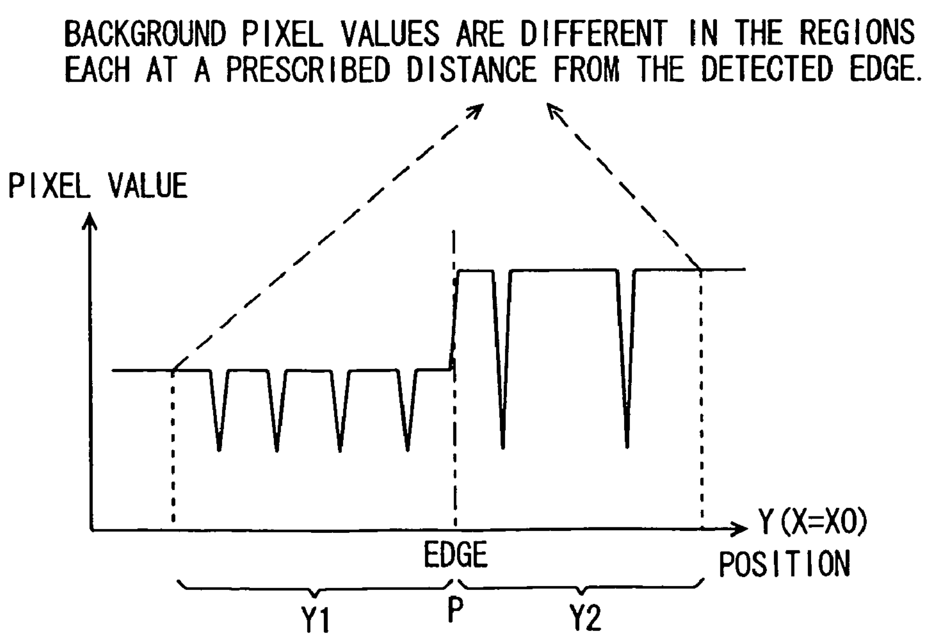
FIG. 11 shows pixel values on a line (X=X0) in the image shown in FIG. 10.

FIG. 11 shows pixel values on the line X=X0 within the lightness image shown in FIG. 10. Referring to FIG. 11, the background pixel values at positions at respective distance Y1, Y2 in opposite directions from the position P of the edge connecting two ends of the original are compared with each other. In this example, the background pixel values in the title region and in the other region are different from each other. In such a case, it is determined that the extracted edge continuously connecting the two ends of the original does not correspond to the fold of the original.

FIG. 12 shows pixel values on a line perpendicular to another detected edge. In the case where the background pixel values at positions at respective distance Y1, Y2 in opposite directions from the edge position P are equal to each other, it is determined that the relevant edge corresponds to the fold of the original. Thus, in this case, the correction is made for the relevant portion corresponding to the fold in step S4 of FIG. 8.

Method Utilizing Attribute of Image

In the method utilizing an attribute of an image, the determination as to whether the extracted edge truly corresponds to the fold of the original is made using the image attribute, instead of the lightness of the background regions used in the above-described method. Here, the image attribute of a region having a photograph included therein becomes a picture attribute, while a region having text therein exhibits a text attribute.

In this method, in the case where two regions at the same distance from a detected edge in opposite directions perpendicular to the edge have the same image attribute, it is determined that the relevant edge corresponds to the fold of the original. If the two regions have the image attributes different from each other, it is determined that the relevant edge does not correspond to the fold of the original. Thus, in the case where a region including a photograph and exhibiting the picture attribute and a region including text and exhibiting the text attribute are located adjacent to each other, the edge of their boundary is prevented from being wrongly extracted as the edge corresponding to the fold of the original. As a result, an unnecessary correction and hence degradation of the image quality can be suppressed.

As explained above, according to the digital camera of the present embodiment, it is possible to remove a noise resulting from a fold of an original from an image picked up from the original. Since the correction can be made using only the picked up image, it is unnecessary to additionally provide a reference plate for shading or a device for measuring a shape of the original. Thus, the configuration is simplified.

Although the fold correcting process for the color image has been described representatively above, the digital camera of the present embodiment can also perform the similar process on a monochrome image. In this case, the process of determining continuity of the color difference component becomes unnecessary, since the monochrome image itself is the lightness image.

For the purposes of speeding the processing and simplifying the device configuration, it is also possible to eliminate the color space conversion even when using the color image. In this case, edges considered to correspond to the folds are extracted from respective plane images, from which any one appearing in all the three plane images is extracted as the edge corresponding to the fold. Further, only the G plane image of the color image can be used, instead of the lightness image, to conduct the process according to the present embodiment.

Although the fold correcting process of the present embodiment has been described to be performed within the digital camera, it is also possible to read the fold correcting program recorded on a recording medium in a personal computer for execution of the program therein. In this case, the image shot by the digital camera can be sent to the personal computer, where the noise corresponding to the fold can be removed from the shot image.

According to the digital camera of the present embodiment, an edge extending from an end to another end of the original is first selected, and it is then confirmed whether it corresponds to the fold of the original with "the method employing the color difference", "the method utilizing the background region of the image", or "the method utilizing the image attribute". Alternatively, it is also possible to confirm an edge corresponding to the fold of the original by first selecting edges with any of "the method employing the color difference", "the method utilizing the background region of the image", "the method utilizing the image attribute" or a combination thereof, and then selecting among them the one extending from an end to another end of the original. For an image which does not include ends of the original therein, the edge corresponding to the fold of the original may be detected using any of "the method employing the color difference", "the method utilizing the background region of the image", "the method utilizing the image attribute", or a combination thereof.

Further, for an image which includes an original under a limited condition, e.g., an original including only a text region and having its background color uniform through the original, it is possible to determine an edge extending from an end to another end of the original included within a generated edge image as the edge corresponding to the fold, without further processing.

Although color space converting unit 106 has been provided in the present embodiment for converting the obtained image to the color space having the lightness component, there are cases where such a unit is unnecessary. An example thereof is the case where the image processing apparatus acquires as its input image an image represented by the color space having the lightness component. Another example is the case where R, G and B values of each pixel are integrated to obtain a lightness value of the relevant pixel, and a lightness image is formed of those lightness values. In this case, the R, G and B values can be increased or decreased in scale in the portion extracted as an edge corresponding to the fold, so that the correction to eliminate a noise resulting from the fold of the original is realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:

a receiving unit to receive an image of an original image;

an edge detecting unit including a processor to detect edges using a lightness component of said received image, said processor determining whether said edges correspond to folds in the original image;

a selecting unit to select an edge determined by said processor to correspond to a fold in the original image as a specific one of said detected edges;

a correcting unit to correct the lightness component of said selected specific edge; and an extracting unit to extract an original region included in said image, wherein said processor determines the edges continuously extending from a first end to a second end of said extracted original region as corresponding to folds in the original image, and said selecting unit selects one of the edges continuously extending from a first end to a second end of said extracted original region as the selected specific edge.

2. An image processing apparatus, comprising:

a receiving unit to receive an image;

a converting unit to convert said received image into a lightness image including the lightness component and into a color difference image including a color difference component;

an edge detecting unit to detect edges in said lightness image using the lightness component;

a selecting unit to select a specific one of said detected edges, wherein said selecting unit selects as the specific edge an edge that is detected in said lightness image and is also undetected as an edge in said color difference image; and a correcting unit to correct the lightness component of the selected specific edge.

3. An image processing apparatus, comprising:

a receiving unit to receive an image of an original image;

an edge detecting unit including a processor to detect edges using a lightness component of said received image, said processor determining whether said edges correspond to folds in the original image;

a selecting unit to select an edge determined by said processor to correspond to a fold in the original image as a specific one of said detected edges;

a correcting unit to correct the lightness component of said selected specific edge; and an attribute detecting unit to detect attributes of two regions separated by one of the edges detected by said edge detecting unit, wherein said processor determines said one of the edges as corresponding to a fold in the original image when said detected attributes of said two regions are identical to each other, and said selecting unit selects said one of the edges as the selected specific edge.

4. An image processing apparatus, comprising:

a receiving unit to receive an image;

an edge detecting unit to detect edges in a lightness image using a lightness component of said received image;

a background luminance value calculating unit to calculate background luminance values of said received image; and a selecting unit to select a specific one of said detected edges, wherein said selecting unit selects a detected edge as the specific edge when the background luminance value of a first region of said received image, at a prescribed distance in a first direction from said detected edge, is substantially equal to the background luminance value of a second region of said received image, at the prescribed distance in a second direction, opposed to the first direction, from said detected edge.

5. A computer readable recording medium recording image processing program to cause a computer to execute the steps of:

receiving an image picked up from an original image;

detecting edges using a lightness component of said received image;

determining whether said edges correspond to folds in the original image;

selecting an edge determined to correspond to a fold in the original image as a specific one of said detected edges;

correcting the lightness component of said selected specific edge; and extracting an original region included in said image, wherein said determining step includes the step of determining the edges continuously extending from a first end to a second end of said extracted original region as corresponding to folds in the original image, and said selecting step includes the step of selecting one of the edges continuously extending from a first end to a second end of the original region as the selected specific edge.

6. A computer readable recording medium recording an image processing program to cause a computer to execute the steps of:

receiving an image picked up from an original;

converting said received image into a lightness image including the lightness component and a color difference image including a color difference component;

detecting edges in said lightness image using the lightness component;

selecting a specific one of said detected edges, wherein said selecting step includes the step of selecting as the specific edge an edge that is detected in said lightness image and is also undetected as an edge in said color difference image; and correcting the lightness component of said selected specific edge.

7. A computer readable recording medium recording an image processing program to cause a computer to execute the steps of:

receiving an image picked up from an original image;

detecting edges using a lightness component of said received image;

determining whether said edges correspond to folds in the original image;

selecting an edge determined to correspond to a fold in the original image as a specific one of said detected edges;

correcting the lightness component of said selected specific edge; and detecting attributes of two regions separated by one of the edges detected by said edge detecting step, wherein said determining step includes determining said one of the edges as corresponding to a fold in the original image when said detected attributes of said two regions are identical to each other, and said selecting step includes the step of selecting said one of the edges as the selected specific edge.

8. A computer readable recording medium recording an image processing program to cause a computer to execute the steps of:

receiving an image picked up from an original;

detecting edges in said lightness image using the lightness component;

calculating a background luminance value of said received image; and selecting a specific one of said detected edges, wherein said selecting step includes the step of selecting a detected edge as the specific edge when the background luminance value of a first region of said received image, at a prescribed distance in a first direction from said detected edge, is substantially equal to the background luminance value of a second region of said received image, at the prescribed distance in a second direction, opposed to the first direction, from said detected edge.

9. An automated image processing method comprising the steps of:

receiving an image picked up from an original image;

detecting edges using a lightness component of said received image;

determining whether said edges correspond to folds in the original image;

selecting an edge determined to correspond to a fold in the original image as a specific one of said detected edges;

correcting the lightness component of said selected specific edge; and extracting an original region included in said image, wherein said determining step includes the step of determining the edges continuously extending from a first end to a second end of said extracted original region as corresponding to folds in the original image, and said selecting step includes the step of selecting one of the edges continuously extending from a first end to a second end of the original region as the selected specific edge.

10. An image processing apparatus, comprising:

an acquiring unit to acquire an image signal expressing a color original image with three components;

a color space converting unit to perform coordinate transformation of the image signal such that the color original image is expressed by a lightness component primarily representing lightness and by another component; and a correcting unit to correct the lightness component in a portion of the color original image that (i) is detected as an edge portion in a lightness image that includes the lightness component and (ii) is undetected as an edge portion in a color difference image that includes the other component, so that after correction the lightness component in a portion of the original image is undetected as an edge portion in the lightness image.

11. An image processing apparatus, comprising:

an acquiring unit to acquire an image signal indicating an original image;

an edge detecting unit to detect an edge in a lightness image, primarily representing lightness of the original image, as a lightness edge; and a correcting unit to correct a lightness component in a portion of the original image detected as the lightness edge when a difference in lightness between opposing portions of the original image, each at a prescribed opposing distance from the lightness edge, is smaller than a prescribed threshold value, so that after correction the lightness component in a portion of the original image is undetected as an edge in the lightness image.

12. An image processing apparatus, comprising:

an acquiring unit to acquire an image signal indicating an original image;

an edge detecting unit to detect an edge in a lightness image, primarily representing lightness of the original image, as a lightness edge; and a correcting unit to correct a lightness component in a portion of the original image detected as the lightness edge when two opposing portions of the original image, each at a prescribed opposing distance from the lightness edge, have an attribute of image of said lightness image that is the same, so that after correction the lightness component in a portion of the original image is undetected as an edge in the lightness image.

* * * * *